(12) United States Patent
Bauerle

(10) Patent No.: US 10,344,810 B2
(45) Date of Patent: Jul. 9, 2019

(54) CVT LOW OIL PRESSURE INPUT CLUTCH FILL COMPENSATION

(71) Applicant: GM GLOBAL TECHNOLOGY OPERATIONS LLC, Detroit, MI (US)

(72) Inventor: Paul A Bauerle, Fenton, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 98 days.

(21) Appl. No.: 15/587,639

(22) Filed: May 5, 2017

(65) Prior Publication Data

US 2018/0320743 A1 Nov. 8, 2018

(51) Int. Cl.
*F16H 61/662* (2006.01)
*F16D 48/02* (2006.01)
*F16H 61/00* (2006.01)
F16H 37/02 (2006.01)
F16H 45/02 (2006.01)
F16H 61/04 (2006.01)
F16H 61/06 (2006.01)

(52) U.S. Cl.
CPC .............. *F16D 48/02* (2013.01); *F16D 25/14* (2013.01); *F16H 61/0021* (2013.01); *F16H 61/662* (2013.01); F16D 2500/1026 (2013.01); F16D 2500/1045 (2013.01); F16D 2500/10412 (2013.01); F16D 2500/10493 (2013.01); F16D 2500/3024 (2013.01); F16D 2500/30805 (2013.01); F16D 2500/5014 (2013.01); F16H 37/022 (2013.01); F16H 45/02 (2013.01); F16H 2061/0093 (2013.01); F16H 2061/0488 (2013.01); F16H 2061/062 (2013.01)

(58) Field of Classification Search
CPC .............................. F16D 48/02; F16H 61/662
See application file for complete search history.

(56) References Cited

U.S. PATENT DOCUMENTS

| | | | | |
|---|---|---|---|---|
| 6,739,998 | B2* | 5/2004 | Iwata | F16H 61/0206 192/3.58 |
| 6,835,147 | B2* | 12/2004 | Iwata | F16H 61/12 474/18 |
| 7,575,111 | B2* | 8/2009 | Ogata | F16H 61/12 192/3.3 |
| 7,621,845 | B2* | 11/2009 | Soga | F16H 61/0021 475/209 |
| 7,951,026 | B2* | 5/2011 | Soga | F16H 61/0021 474/28 |

(Continued)

*Primary Examiner* — David R Morris

(57) ABSTRACT

A method for CVT low oil pressure input clutch fill compensation includes performing a garage shift when a modeled fill pressure is equal to a commanded modeled fill pressure. Then the line pressure is checked to determine if it is less than the commanded fill pressure when performing the garage shift. If so, then the modeled fill pressure is set to the line pressure and the primary and secondary actual pulley pressures are read by sensing devices. Next, the primary and secondary commanded pulley pressures are checked to determine if they are greater than the modeled fill pressure. If so, then a first dPressure value for the flow rate model based on the lowest of the modeled fill pressure, the primary actual pulley pressure, or the secondary actual pulley pressure is determined and it is used to compensate the flow rate model.

3 Claims, 4 Drawing Sheets

(56) References Cited

U.S. PATENT DOCUMENTS

| | | | |
|---|---|---|---|
| 7,993,225 B2 * | 8/2011 | Ogata | F16H 61/12 474/28 |
| 8,038,553 B2 * | 10/2011 | Soga | F16H 61/66272 474/18 |
| 8,406,969 B2 * | 3/2013 | Shimozato | F16D 48/02 477/34 |
| 8,781,674 B2 * | 7/2014 | Iraha | F16D 48/062 477/34 |
| 9,033,852 B2 * | 5/2015 | Horiike | B60W 10/023 477/61 |
| 9,366,328 B2 * | 6/2016 | Yoshino | F16H 37/021 |
| 9,371,896 B2 * | 6/2016 | Kobayashi | F16H 37/021 |
| 9,587,726 B2 * | 3/2017 | Yoshida | F16H 37/021 |
| 2003/0083169 A1 * | 5/2003 | Iwata | F16H 61/12 475/208 |
| 2003/0119618 A1 * | 6/2003 | Iwata | F16H 61/0206 475/127 |
| 2007/0270280 A1 * | 11/2007 | Takamatsu | F16H 61/24 477/125 |
| 2008/0047794 A1 * | 2/2008 | Ogata | F16H 61/12 192/3.3 |
| 2008/0207396 A1 * | 8/2008 | Soga | F16H 61/0021 477/168 |
| 2009/0065318 A1 * | 3/2009 | Soga | F16H 61/0021 192/3.29 |
| 2009/0069131 A1 * | 3/2009 | Soga | F16H 61/66272 474/18 |
| 2010/0151977 A1 * | 6/2010 | Ogata | F16H 61/12 474/28 |
| 2010/0292900 A1 * | 11/2010 | Shimozato | F16D 48/02 701/53 |
| 2011/0087397 A1 * | 4/2011 | Iraha | F16H 61/12 701/31.4 |
| 2014/0302965 A1 * | 10/2014 | Horiike | B60W 10/023 477/53 |
| 2015/0087452 A1 * | 3/2015 | Yoshino | F16H 37/021 474/1 |
| 2015/0107410 A1 * | 4/2015 | Yoshida | F16H 37/021 74/664 |
| 2015/0135894 A1 * | 5/2015 | Kobayashi | F16H 37/021 74/664 |

* cited by examiner

CVT LOW OIL PRESSURE INPUT CLUTCH FILL COMPENSATION

TECHNICAL FIELD

The present disclosure pertains to a propulsion system having continuously variable transmission (CVT), and more particularly, a method for CVT low oil pressure input clutch fill compensation.

INTRODUCTION

A continuously variable transmission (CVT) is a type of power transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve the infinitely variable selection of gear ratios.

The pulley system, which is commonly referred to as a variator assembly, can transition anywhere within a calibrated range of speed ratios. A typical belt-type or chain-type variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary pulley. The other pulley is connected via additional gear sets to an output shaft of the CVT and thus acts as a driven/secondary pulley.

In order to vary a CVT speed ratio and to transfer torque to the drivetrain, a clamping force (applied through hydraulic pressure) may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT.

In some instances during a garage shift (GS), e.g., shifting from Park to Drive or Reverse/Neutral to Drive or Reverse/Drive to Reverse, there is not enough hydraulic (fill) pressure to satisfy both of the clutch engagement and variator pulley(s) clamping which creates a need to compensate the fill pressure to the clutch system during these types of shifts. However, there is no way to directly detect when conditions of low clutch fill pressure exists which require GS compensation. To this end, it is desirable to have a reliable means for CVT low oil pressure input clutch fill compensation during first garage shifts or any GS for conditions of low clutch fill pressure.

SUMMARY

The present disclosure provides a method for CVT low oil pressure input clutch fill compensation. In accordance with aspects of an exemplary embodiment, a method for CVT low oil pressure input clutch fill compensation includes performing a garage shift when a modeled fill pressure is equal to a commanded fill pressure. Another aspect of the exemplary embodiment includes determining if a line pressure is less than the commanded fill pressure when performing the garage shift. And another aspect includes setting a modeled fill pressure to the line pressure when the line pressure is less than the commanded fill pressure. Yet another aspect includes reading primary and secondary actual pulley pressures. Still another aspect includes determining if primary and secondary commanded pulley pressures are greater than the modeled fill pressure. And still another aspect includes determining a first delta pressure (dPressure) value for the flow rate model based on the lowest of the modeled fill pressure, the primary actual pulley pressure, or the secondary actual pulley pressure when the primary and secondary commanded pulley pressures are greater than the modeled fill pressure. Yet one other aspect includes compensating the flow rate model using the highest of the first dPressure value and a first predetermined calibration threshold.

In accordance with the further aspects of the exemplary embodiment, another aspect includes determining if a hydraulic delay period condition exists prior to determining if a line pressure is less than the commanded fill pressure. And still another aspect includes resetting primary and secondary pulley pressure latches when a hydraulic delay period condition exists. Yet another aspect includes wherein determining if primary and secondary commanded pulley pressures are greater than the modeled fill pressure further comprises determining if primary and secondary latches are reset. And another aspect includes determining if either of the primary or secondary commanded pulley pressures is greater than the modeled fill pressure and an appropriate primary or secondary latch is reset.

A further aspect in accordance with the exemplary embodiment includes setting the primary or secondary pressure latch for the primary or secondary pulley pressure command that is less than the modeled fill pressure when either of the primary or secondary commanded pulley pressures are greater than the modeled fill pressure and the appropriate primary or secondary latch is reset. And another aspect includes determining a second dPressure value for the flow rate model based on the lowest of the modeled fill pressure and the primary or secondary actual pulley pressure that has a commanded pulley pressure greater than the modeled fill pressure.

Still another aspect includes compensating the flow rate model using the highest of the second dPressure value and a second predetermined calibration threshold. And yet another aspect includes setting the primary and secondary pressure latches for the primary and secondary pulley pressure commands when either of the primary or secondary commanded pulley pressures is not greater than the modeled fill pressure.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
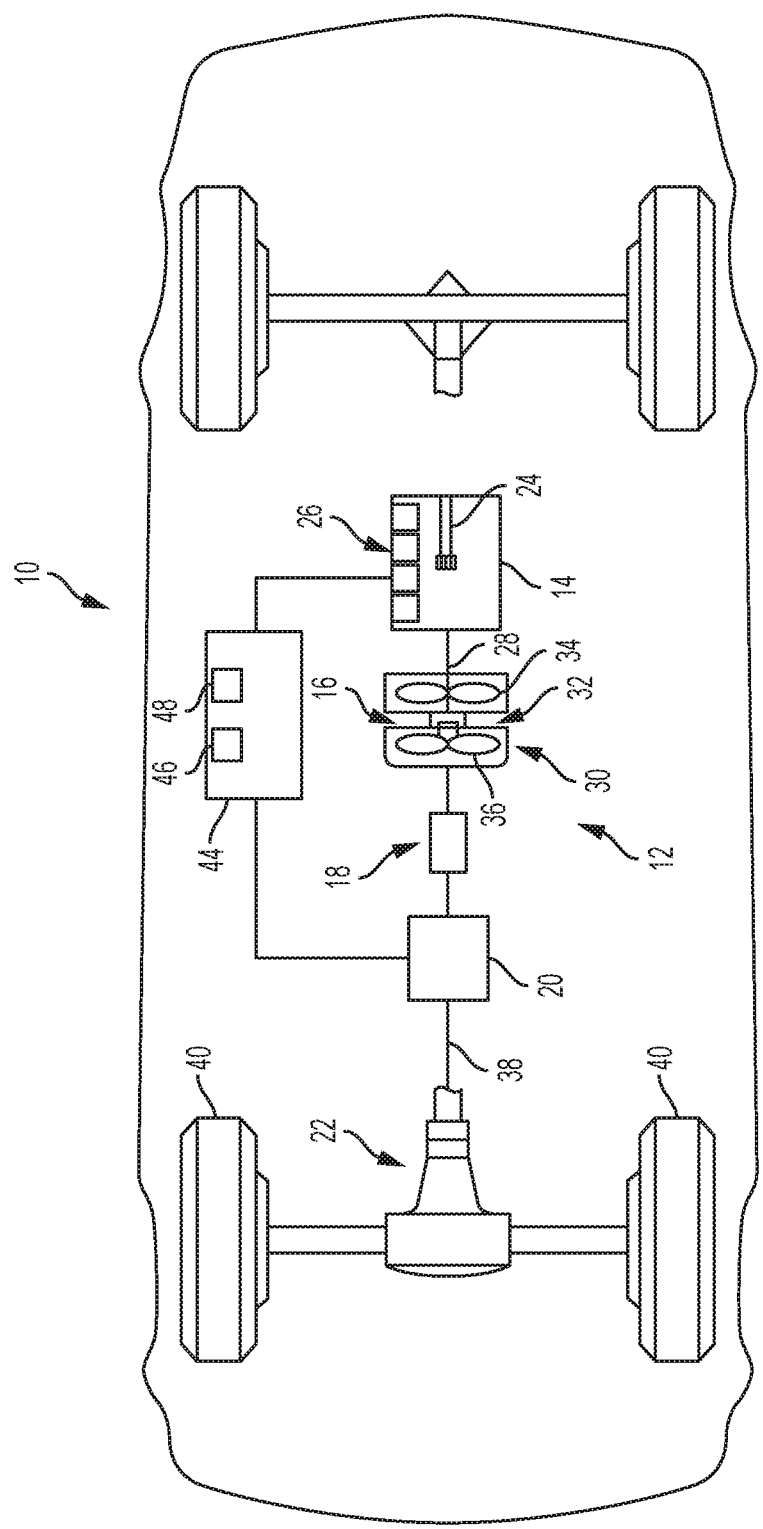
FIG. 1 is a schematic plan view of a motor vehicle including a propulsion system, in accordance with the exemplary embodiment.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring now to the drawings, wherein like reference numbers correspond to like or similar components throughout the several figures, FIG. 1 schematically illustrates a motor vehicle generally designated at 10. The motor vehicle 10 may be any type of vehicle, such as a car, truck, van, sport-utility vehicle, etc.

The motor vehicle 10 includes a propulsion system 12 configured to power the motor vehicle 10. The propulsion system 12 may include an engine 14, a torque converter coupling 16, a forward drive clutch or switching mechanism 18, a continuously variable transmission (CVT) 20, and a final drive assembly 22. The engine 14 could be an internal combustion engine, an electric engine, or a hybrid, by way of example. The engine 14 is operable to power the motor vehicle 10 and includes a crankshaft 24 configured to rotate to move a plurality of pistons (not shown) within a plurality of piston cylinders 26. The crankshaft 24 is configured to move each of the pistons within its own respective cylinder 26.

Although the engine 14 is depicted as including four cylinders 26, the engine 14 may include any desired number of cylinders 26, such as two, three, four, six, or eight, by way of example. Each cylinder 26 is configured to undergo a combustion event to power the motor vehicle 10. The engine 14 has an engine output shaft 28 configured to transfer torque to the torque converter coupling 16.

The torque converter coupling 16 is connected to the engine output shaft 28 and includes a torque converter 30 and a torque converter lockup clutch 32. The torque converter 30 has an impeller (or pump) 34 and a turbine 36, which are typically separated by a stator (not shown). The impeller 34 is fixed to the engine output shaft 28. The impeller 34 is configured to form a fluid coupling with the turbine 36 under certain conditions, as is known in the art. The torque converter lockup clutch 32 is configured to selectively increase the torque-transmitting capacity between the impeller 34 and the turbine 36 to transmit torque and rotation between the impeller 34 and the turbine 36.

The turbine 36 is connected to the forward drive coupling/switching device 18, which may include a friction clutch, a binary clutch, or a Sprague type device, by way of example. The forward drive coupling/switching device 18 couples the engine 14 and CVT 20 in a forward direction. The CVT 20 is configured to selectively change a gear ratio between the engine output shaft 28 and a transmission output shaft 38. The forward drive coupling/switching device 18 is configured to selectively connect the turbine 36 to the CVT 20. The CVT 20 is interconnected with the final drive unit 22 to propel a set of wheels 40 of the motor vehicle 10. Although referred to generally as a CVT 20, the CVT 20 may be a continuously variable transmission, or an infinitely variable transmission, by way of example.

A control system 44 may be used to control the engine 14 and/or the CVT 20. In some variations, the control system 44 includes an engine control module 46 and a transmission control module 48, by way of example. The engine 14 and the CVT 20 may be equipped with a plurality of actuators and sensing devices for monitoring operation, and in the case of the engine 14, for delivering fuel to form a combustion charge to produce torque that is responsive to an operator torque request. The sensors associated with the engine 14 or CVT 20 may be configured to provide feedback to the control system 44.

Figure 2:
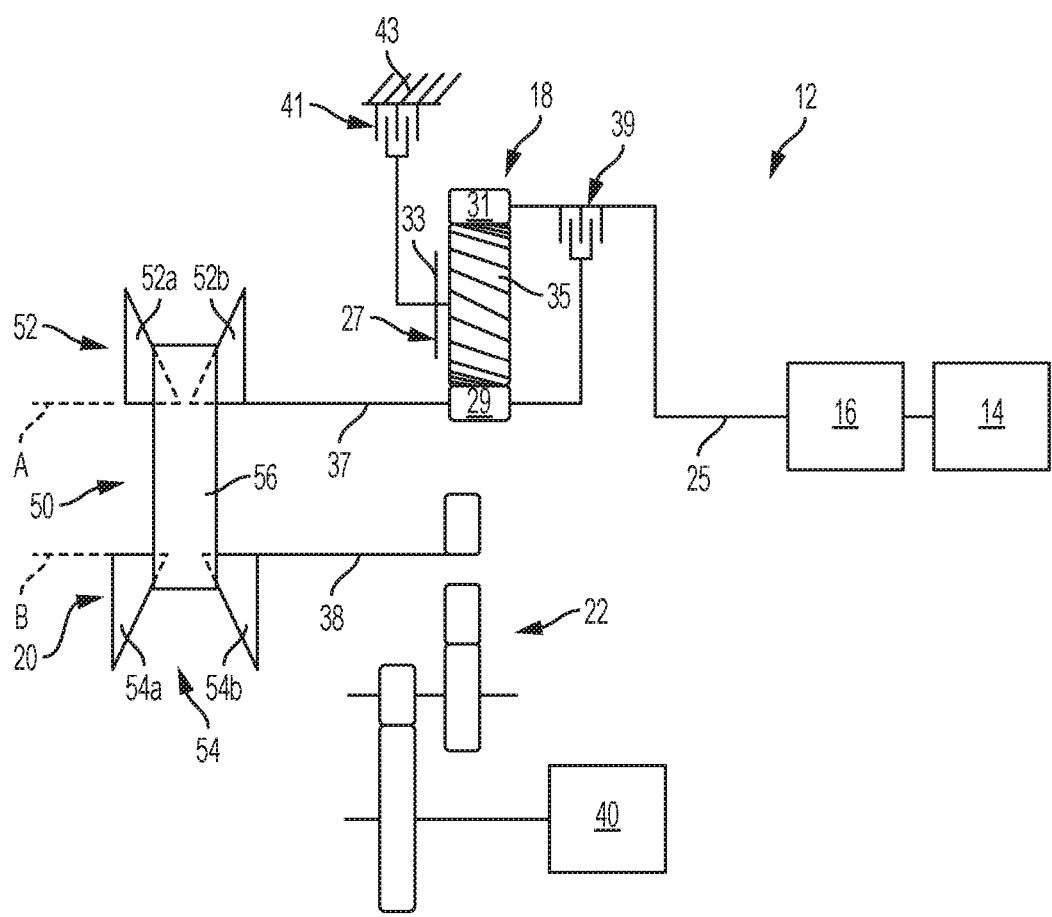
FIG. 2 is a schematic diagrammatic illustration of the motor vehicle propulsion system of FIG. 1 that shows an automotive engine rotatably coupled to a continuously variable transmission (CVT), in accordance with the exemplary embodiment.

Referring now to FIG. 2, additional details of the propulsion system 12 including the CVT 20 are illustrated. The engine 14, torque converter coupling 16, final drive assembly 22, and wheels 40 are schematically illustrated, and any description above with respect to these elements shown in FIG. 1 applies equally here. A gearbox (not shown) may also be included upline or downline of the CVT 20 for additional gearing options.

The output member 25 of the torque converter coupling 16 rotatably couples to the forward-reverse switching mechanism 18 and serves as an input to the CVT 20. The forward-reverse switching mechanism 18 is provided because the engine 14 is operated in a predetermined single direction. The forward-reverse switching mechanism 18 may be provided in a number of different configurations, without falling beyond the spirit and scope of the present disclosure. In the specific example of FIG. 2, the forward-reverse switching mechanism 18 includes a simple planetary gear set 27 including a sun gear 29, a ring gear 31 disposed coaxially about the sun gear 29, and a carrier 33 bearing a plurality of pinion gears 35 that mesh with both the sun gear 29 and the ring gear 31. In other variations, a double-pinion planetary gear set could be used, having one set of pinion gears meshing with a second set of pinion gears, the first set of pinion gears meshing with the sun gear 29 and the second set of pinion gears meshing with the ring gear 31, or simply a type of forward drive clutch could be used. The output member 25 of the torque converter coupling 16 is continuously connected to the ring gear 31, and an input member 37 to the CVT 20 is continuously connected to the sun gear member 29, in this example.

The forward-reverse switching mechanism 18 further includes a forward clutch 39 and a reverse brake 41. The forward clutch 39 is selectively engageable to connect the sun gear 29 and CVT input member 37 to the ring gear 31 and the torque converter output member 25 so that these elements rotate together as a single unit. Accordingly, the engine 14 is then operable to drive the CVT 20 in a forward direction. The reverse brake 41 is selectively engageable to connect the carrier member 33 with a stationary member, such as the transmission housing 43, so that the direction of the input rotation would then be reversed, as applied to the CVT input member 37. It should be understood, however, that the torque converter output member 25 and CVT input member 37, as well as the reverse brake 41 and the forward clutch 39, could be interconnected in a different manner and still achieve forward-reverse switching, without falling beyond the spirit and scope of the present disclosure. For example, other power flows to alternate between forward and reverse could be used, such as alternative configurations using two or three clutches and/or one, two, or more gear sets. The forward clutch 39 and reverse brake 41 may each be controlled by an actuator, such as a hydraulically controlled actuator, that supplies fluid pressure to the clutch 39 or brake 41.

In this example, the CVT 20 is a belt-type or chain-type CVT that may be advantageously controlled by the control system 44. The CVT 20 includes a variator assembly 50 that transfers torque between the CVT input member 37 and the CVT output member 38. The variator assembly 50 includes a first, or primary pulley 52, a second, or secondary pulley 54, and a continuous rotatable device 56, such as a belt or chain, or any flexible continuous rotating device that rotatably couples the first and second pulleys 52, 54 to transfer torque therebetween. The first pulley 52 and input member 37 rotate about a first axis A, and the second pulley 54 and output member 38 rotate about a second axis B. One of the first and second pulleys 52, 54 may act as a ratioing pulley to establish a speed ratio and the other of the first and second pulleys 52, 54 may act as a clamping pulley to generate sufficient clamping force to transfer torque. As used herein, the term 'speed ratio' refers to a variator speed ratio, which may be a ratio of a CVT output speed and a CVT input speed, which may also be referred to as the transmission gear ratio. Thus, the distance between the first pulley halves 52a, 52b may be varied (by moving one or more of the pulley halves 52a, 52b along the axis A) to move the continuous member 56 higher or lower within the groove defined between the two pulley halves 52a, 52b. Likewise, the second pulley halves 54a, 54b may be moved with respect to each other along the axis B to change the ratio or torque-carrying capacity of the CVT 20. One or both pulley halves 52a, 52b, 54a, 54b of each pulley 52, 54 may be moved with an actuator, such as a hydraulically-controlled actuator that varies the fluid pressure supplied to the pulleys 52, 54.

The motor vehicle propulsion system 12 preferably includes one or more sensors or sensing devices, such as Hall-effect sensors, for monitoring rotational speeds of various devices (not shown), including, e.g., a primary pulley pressure sensor, a secondary pulley pressure sensor, an engine speed sensor, a torque converter turbine speed sensor, a CVT variator input speed sensor, a CVT variator output speed sensor, and one or more wheel speed sensors. Each of the sensors communicates with the control system 44.

Figure 3A:
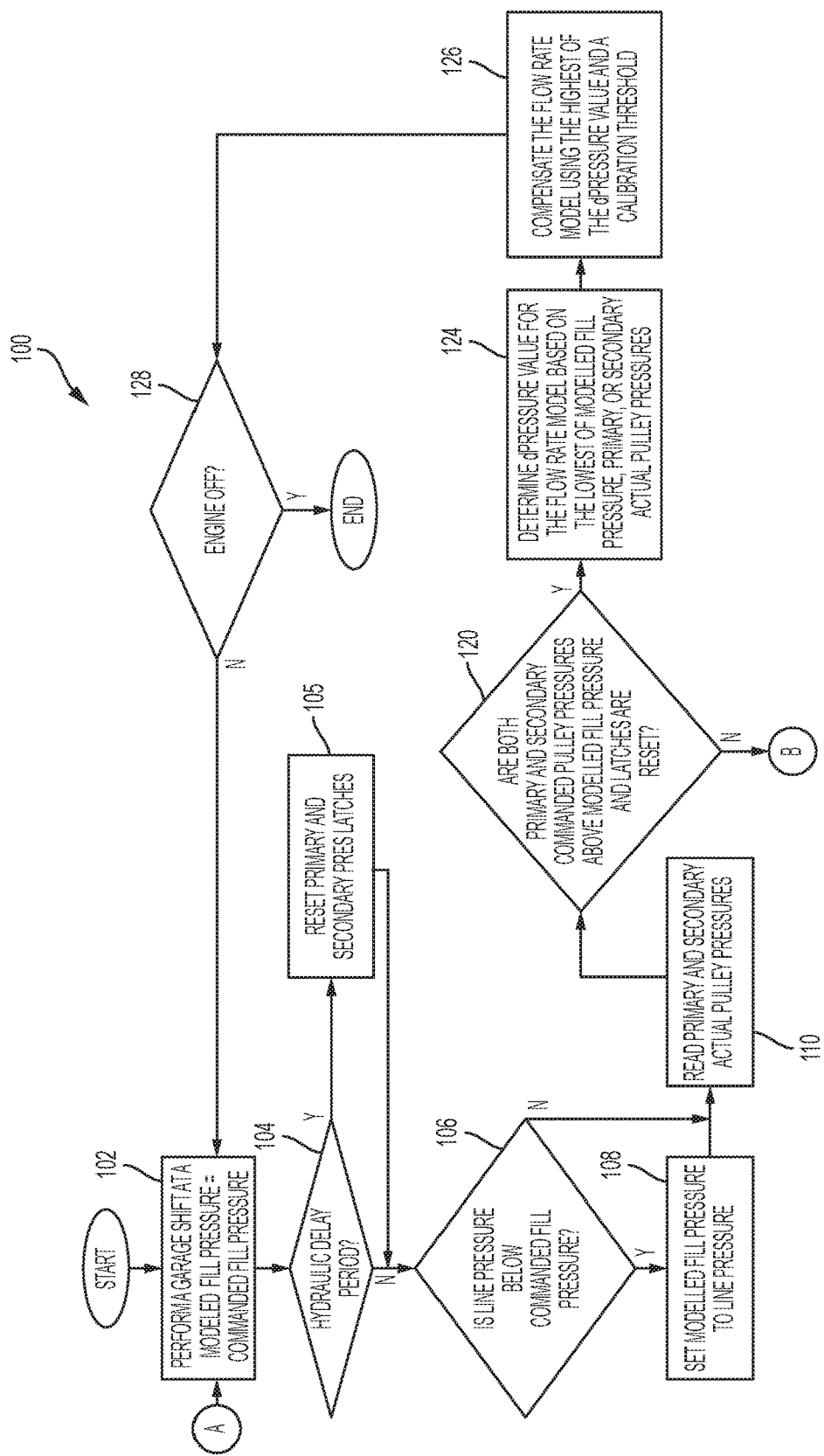
FIG. 3A is an illustration of a method for CVT low oil pressure input clutch fill compensation in accordance with aspects of the exemplary embodiment.
Figure 3B:
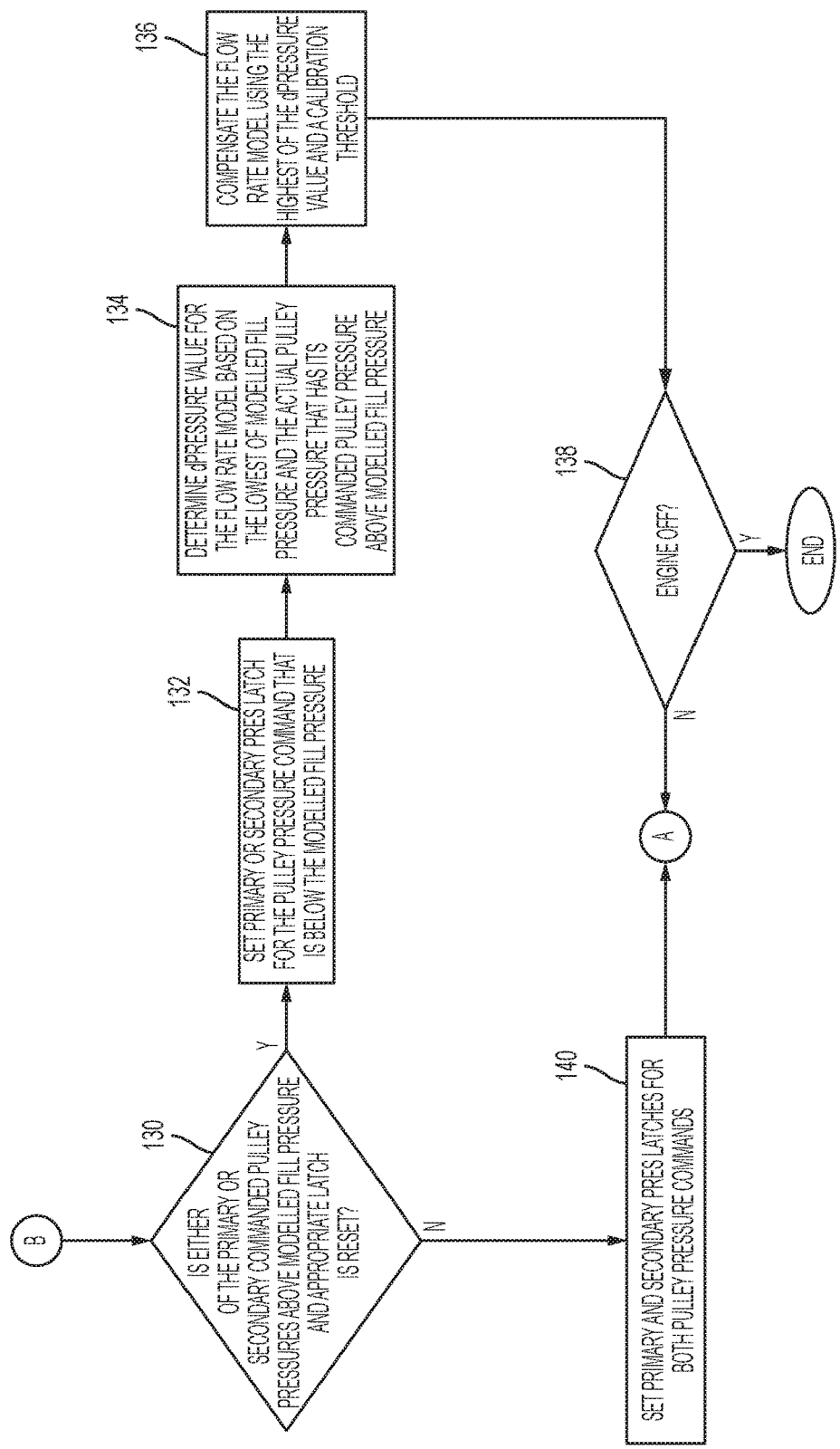
FIG. 3B is a continuation of the method for CVT low oil pressure input clutch fill compensation in accordance with aspects of the exemplary embodiment.

Referring now to FIG. 3, an algorithm 100 of a method for CVT low oil pressure input clutch fill compensation in accordance with aspects of the exemplary embodiment is provided. The method for CVT low oil pressure input clutch fill compensation is provided as a means for CVT low oil pressure input clutch fill compensation during first garage shifts or any GS for conditions of low clutch fill pressure.

It is appreciated during a GS event in a CVT that sometimes there is not enough hydraulic (fill) pressure to satisfy both of the clutch engagement and variator pulley(s) clamping which creates a need to compensate the fill pressure to the clutch/clamping system during these types of shifts. There is no way to directly detect, e.g., with a sensing device, when conditions of low clutch fill pressure exists which require GS fill compensation. However, there are primary and secondary pulley pressure sensors that are configured to measure primary and secondary actual pulley pressure values, respectively, which can be used to infer that the clutch fill pressure is low when either the primary or secondary actual pulley pressures is less than a commanded fill pressure in accordance with aspects of the exemplary embodiment.

At block 102, the method for CVT low oil pressure input clutch fill compensation begins with performing a garage shift (GS) when a modeled fill pressure is equal to a commanded fill pressure. In this instance, the commanded fill pressure, if accommodated, should be sufficient to facilitate the GS without any degraded performance. At block 104, the method continues with determining if a hydraulic delay period condition exists prior to determining if a line pressure is less than the commanded fill pressure. A hydraulic delay period occurs due to a lag between the actual fill pressure and the commanded fill pressure because of inherent system hydraulic pressure latency properties. If a hydraulic delay period condition exists then, at block 105, the method continues with resetting primary and secondary pulley pressure latches to ensure they are latched under sufficient pressure conditions.

At block 106, the method continues with determining if a line pressure is less than the commanded fill pressure when performing the garage shift. If so, then at block 108 the method continues with setting a modeled fill pressure to the line pressure. Normally line pressure is always commanded higher than fill pressure. The line pressure command could be lower than garage shift fill pressure commands under some conditions that override the line pressure to a lower than normal value, such as intrusive diagnostic tests and remedial actions. These overrides are rare, but cause the commanded garage shift fill pressure to be limited to the lower line pressure, so it is required to set the modeled fill pressure to line pressure. Next, if the line pressure is not less than the commanded fill pressure, then at block 110, the method continues with reading primary and secondary actual pulley pressures via the pulley pressure sensors.

At block 120, the method continues with determining if primary and secondary commanded pulley pressures are greater than the modeled fill pressure and the latches are reset. If both of the primary and secondary commanded pulley pressures are greater than the modeled fill pressure then an underfill condition could result if the modeled fill pressure command is not adjusted lower properly because the clutch fill time would be too short to fulfill the garage shift event. Thus, if both of the primary and secondary commanded pulley pressures are greater than the modeled fill pressure then, at block 124, the method continues with determining a first delta pressure (dPressure) value for the flow rate model based on the lowest of the modeled fill pressure, the primary actual pulley pressure, or the secondary actual pulley pressure. Appropriate dPressure values are either calculated in real-time by a control module or selected from a stored location in the control module based on the lowest of the either of the primary pulley pressure, secondary pulley pressure, or the modeled fill pressure.

At block 126, the method continues with compensating the flow rate model using the highest of the first dPressure value and a first predetermined calibration threshold. This calibration threshold is set to a value of between 100 and 150 kPa to ensure the garage shift fill event will complete in a reasonable amount of time if the actual pulley pressure values are unrealistically too low. For example, an intermittent electrical fault could cause the actual pulley pressures to dip too low before being diagnosed, leading to the garage shift fill time extending too long and an overfilled clutch with a harsh garage shift feel will result. This compensation event is intended to increase the clutch fill time to a level sufficient to fulfill the GS event. Next, at block 128, the method continues with determining if the engine has been turned off. If so, the method ends. If not, then the method returns to block 102.

Referring again to block 120, if the primary and secondary commanded pulley pressures are not greater than the modeled fill pressure then, at block 130, the method continues with determining if either of the primary or secondary commanded pulley pressures is greater than the modeled fill pressure and an appropriate primary or secondary latch is reset. If either of the primary or secondary commanded pulley pressures is greater than the modeled fill pressure then, at block 132, the method continues with setting the primary or secondary pressure latch for the primary or secondary pulley pressure command that is less than the modeled fill pressure.

At block 134, the method continues with determining a second dPressure value for the flow rate model based on the lowest of the modeled fill pressure and the primary or secondary actual pulley pressure that has a commanded pulley pressure greater than the modeled fill pressure. Then, at block 136, the method continues with compensating the flow rate model using the highest of the second dPressure value and a second predetermined calibration threshold that could be set to the same value as the first predetermined calibration threshold.

At block 138, the method continues with determining if the engine is off. If so, then the method ends. If not, then the method returns to block 102 to continue the method. Referring again to block 130, if neither of the primary nor secondary commanded pulley pressures is greater than the modeled fill pressure then, at block 140, the method continues with setting the primary and secondary pressure latches for the primary and secondary pulley pressure commands. In such case, the commanded pulley pressures should result in adequate line pressure being provided to the clutch system to sustain the GS event. After setting the primary and secondary pressure latches for the primary and secondary pulley pressure commands, the method returns to block 102 to repeat the process until the engine is turned off.

The detailed description and the drawings or figures are supportive and descriptive of the disclosure, but the scope of the disclosure is defined solely by the claims. While some examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one of the examples of an example can be combined with one or a plurality of other desired characteristics from other examples, resulting in other examples not described in words or by reference to the drawings. Accordingly, such other examples fall within the framework of the scope of the appended claims.

What is claimed is:

1. A method for low oil pressure compensation for an input clutch in a continuously variable transmission, the method comprising:
   performing a garage shift when a modeled fill pressure is equal to a commanded fill pressure;
   determining if line pressure is less than the commanded fill pressure when performing the garage shift;
   determining if a hydraulic delay period condition exists prior to determining if the line pressure is less than the commanded fill pressure;
   setting the modeled fill pressure to the line pressure when the line pressure is less than the commanded fill pressure;
   reading primary and secondary actual pulley pressures;
   determining if primary and secondary commanded pulley pressures are greater than the modeled fill pressure;
   determining a first dPressure value used in a flow rate model of the input clutch based on the lowest of the modeled fill pressure, the primary actual pulley pressure, or the secondary actual pulley pressure when the primary and secondary commanded pulley pressures are greater than the modeled fill pressure; and
   compensating the flow rate model by increasing a time to fill the input clutch by using the highest of the first dPressure value and a first predetermined calibration threshold in the flow rate model.

2. The method of claim 1 further comprising determining a second dPressure value used in the flow rate model based on the lowest of the modeled fill pressure and the primary or secondary actual pulley pressure that has a commanded pulley pressure greater than the modeled fill pressure.

3. The method of claim 2 further comprising compensating the flow rate model using the highest of the second dPressure value and a second predetermined calibration threshold.

\* \* \* \* \*